US012298205B2

(12) United States Patent
Carpino, II et al.

(10) Patent No.: US 12,298,205 B2
(45) Date of Patent: May 13, 2025

(54) ELECTRONIC PULSE INJECTION SYSTEM FOR AN ICING WIND TUNNEL

(71) Applicant: GOODRICH CORPORATION, Charlotte, NC (US)

(72) Inventors: Richard J. Carpino, II, Canton, OH (US); Anthony Varca, Bluff Dale, TX (US); Matthew Hamman, Fairview Park, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 320 days.

(21) Appl. No.: 17/946,820

(22) Filed: Sep. 16, 2022

(65) Prior Publication Data

US 2024/0094085 A1 Mar. 21, 2024

(51) Int. Cl.
| | |
|---|---|
| *G01M 9/04* | (2006.01) |
| *B05B 1/08* | (2006.01) |
| *B05B 1/20* | (2006.01) |
| *B05B 1/30* | (2006.01) |
| *B05B 7/00* | (2006.01) |

(Continued)

(52) U.S. Cl.
CPC .............. *G01M 9/04* (2013.01); *B05B 12/06* (2013.01); *B05B 12/082* (2013.01); *B05B 1/083* (2013.01); *B05B 1/20* (2013.01); *B05B 1/3053* (2013.01); *B05B 7/0075* (2013.01); *B05B 12/085* (2013.01); *B05B 15/40* (2018.02)

(58) Field of Classification Search
CPC ........ G01M 9/04; B05B 12/06; B05B 12/082; B05B 15/40; B05B 1/083; B05B 1/20; B05B 1/3053; B05B 7/0075; B05B 12/085

See application file for complete search history.

(56) References Cited

U.S. PATENT DOCUMENTS

| | | | | |
|---|---|---|---|---|
| 4,584,980 | A * | 4/1986 | Weiger | F02M 59/468 |
| | | | | 123/498 |
| 5,942,682 | A * | 8/1999 | Ghetzler | G01M 9/06 |
| | | | | 73/147 |
| 2004/0235308 | A1 * | 11/2004 | Sato | H01L 21/67051 |
| | | | | 257/E21.228 |

FOREIGN PATENT DOCUMENTS

| | | |
|---|---|---|
| CN | 203643124 | 6/2014 |
| CN | 212493555 X | 2/2021 |

(Continued)

OTHER PUBLICATIONS

European Patent Office, European Search Report dated Feb. 19, 2024 in Application No. 23198047.5.

*Primary Examiner* — Jonathan M Dunlap
*Assistant Examiner* — John M Royston
(74) *Attorney, Agent, or Firm* — SNELL & WILMER L.L.P.

(57) ABSTRACT

A system is provided for dispersing supercooled liquid water in an icing wind tunnel. The system includes a spray bar; a spray nozzle coupled to the spray bar; a pressure control valve coupled to the spray bar; and a controller coupled to the pressure control valve and the spray nozzle. The controller is configured to receive input identifying a selected liquid water content and a selected water droplet size for dispersing the supercooled liquid water in the icing wind tunnel; configure an injector duty cycle of the spray nozzle to generate the selected liquid water content; and configure the pressure control valve to generate the selected water droplet size, wherein configuring the spray nozzle and the pressure control valve disperses the supercooled liquid water in the icing wind tunnel.

19 Claims, 12 Drawing Sheets

(51) Int. Cl.
*B05B 12/06* (2006.01)
*B05B 12/08* (2006.01)
*B05B 15/40* (2018.01)

(56) References Cited

FOREIGN PATENT DOCUMENTS

| | | | | |
|---|---|---|---|---|
| CN | 110320002 | | 5/2021 | |
| CN | 113670557 | | 11/2021 | |
| EP | 2650665 | | 10/2013 | |
| EP | 2650665 | A2 * | 10/2013 | ................ F25C 1/00 |
| EP | 2995382 | | 3/2016 | |
| EP | 3667283 | | 6/2020 | |
| EP | 3667283 | A1 * | 6/2020 | ................ B64F 5/60 |

* cited by examiner

ELECTRONIC PULSE INJECTION SYSTEM FOR AN ICING WIND TUNNEL

FIELD

The present disclosure relates to systems and methods for dispersing supercooled liquid water in an icing wind tunnel, and more specifically, to utilizing electronic pulse injection to generate water droplets of different sizes in an icing wind tunnel.

BACKGROUND

In 2015, the Federal Aviation Administration (FAA) added Title 14 Federal Aviation Regulation (FAR) Part 25 Appendix O for Supercooled Large Drop Icing Conditions to Title 14 FAR Part 25 Appendix C Atmospheric Icing Conditions.

Appendix C describes continuous maximum icing as a maximum continuous intensity of atmospheric icing conditions (continuous maximum icing) defined by the variables of the cloud liquid water content, i.e., water in a discrete liquid phase, the mean effective diameter (commonly called the Median Volume Diameter (MVD)) of the cloud droplets, the ambient air temperature, and the interrelationship of these three variables. Appendix C further describes intermittent maximum icing as an intermittent maximum intensity of atmospheric icing conditions (intermittent maximum icing) defined by the variables of the cloud liquid water content, the mean effective diameter of the cloud droplets, the ambient air temperature, and the interrelationship of these three variables. Appendix C still further describes takeoff maximum icing as a maximum intensity of atmospheric icing conditions for takeoff (takeoff maximum icing) defined by the cloud liquid water content of 0.35 g/m3, the mean effective diameter of the cloud droplets of 20 microns, and the ambient air temperature at ground level of minus 9 degrees Celsius (−9° C.).

Appendix O describes icing conditions are defined by the parameters of altitude, vertical and horizontal extent, temperature, liquid water content, and water mass distribution as a function of drop diameter distribution. Appendix O describes freezing drizzle (conditions with spectra maximum drop diameters from 100 μm to 500 μm) as: (1) Pressure altitude range: 0 to 22,000 feet mean sea level (MSL); (2) Maximum vertical extent: 12,000 feet; (3) Horizontal extent: Standard distance of 17.4 nautical miles; (4) Total liquid water content; (5) Drop diameter distribution; and (6) Altitude and temperature envelope. Appendix O further describes freezing rain (conditions with spectra maximum drop diameters greater than 500 μm) as: (1) Pressure altitude range: 0 to 12,000 ft MSL; (2) Maximum vertical extent: 7,000 ft; (3) Horizontal extent: Standard distance of 17.4 nautical miles; (4) Total liquid water content; (5) Drop Diameter Distribution; and (6) Altitude and temperature envelope. Appendix C still further describes a horizontal extent such that the liquid water content for freezing drizzle and freezing rain conditions for horizontal extents other than the standard 17.4 nautical miles can be determined by the value of the liquid water content, multiplied by the factor, which is defined by the following equation:

$$S = 1.266 - 0.213 \log 10(H)$$

where: S=Liquid Water Content Scale Factor (dimensionless) and H=horizontal extent in nautical miles.

SUMMARY

According to various embodiments of the present disclosure, a system for dispersing supercooled liquid water in an icing wind tunnel is provided. The system includes a spray bar; a spray nozzle coupled to the spray bar; a pressure control valve coupled to the spray bar; and a controller coupled to the pressure control valve and the spray nozzle. The controller is configured to: receive input identifying a selected liquid water content and a selected water droplet size for dispersing the supercooled liquid water in the icing wind tunnel; configure an injector duty cycle of the spray nozzle to generate the selected liquid water content; and configure the pressure control valve to generate the selected water droplet size, where configuring the spray nozzle and the pressure control valve disperses the supercooled liquid water in the icing wind tunnel.

In various embodiments, the controller is further configured to: receive water droplet size data generated within the icing wind tunnel; determine whether a water pressure needs to change based on the water droplet size data; and send a command to adjust the water pressure via the pressure control valve to either increase or decrease the water pressure in response to the water pressure needing to change. In various embodiments, the water droplet size data is interpreted based on data received from a pressure transducer associated with the spray bar or the water droplet size data is received from a water droplet size sensor. In various embodiments, the spray bar is a plurality of spray bars, where each spray bar in the plurality of spray bars includes a respective pressure control valve, and where adjusting the water pressure of the plurality of spray bars includes the controller being configured to: send individual commands to adjust the water pressure via the respective pressure control valves associated with the plurality of spray bars to either increase or decrease the water pressure in response to the water pressure needing to change.

In various embodiments, the controller is further configured to: receive liquid water content data generated within the icing wind tunnel; determine whether a liquid water content needs to change based on the liquid water content data; and send a command to adjust an injector duty cycle of the spray nozzle to increase or decrease the liquid water content in response to the liquid water content needing to change. In various embodiments, the liquid water content data is interpreted based on water flow data received from one or more water flow meters associated with the spray bar or the liquid water content data is received from a liquid water content sensor. In various embodiments, the spray nozzle is a plurality of spray nozzles, where adjusting the liquid water content of the plurality of spray nozzles includes the controller being configured to: send individual commands to the plurality of spray nozzles to adjust an injector duty cycle to increase or decrease the liquid water content in response to the liquid water content needing to change.

In various embodiments, the spray nozzle is at least one a low-pressure electronic pulse injector, a high-pressure electronic pulse injector, or a high-pressure piezoelectric pulse injector. In various embodiments, the spray bar is at least two spray bars, where a first spray bar of the at least two spray bars is a low-pressure spray bar, where a second spray bar of the at least two spray bars is a high-pressure spray bar, and where the controller is further configured to: configure the water pressure the first spray bar to generate first water droplets of a first diameter; configure the water pressure to the second spray bar to generate second water droplets of a second diameter, where the second diameter is smaller than the first diameter; or configure the water pressure to the first spray bar and the second spray bar to generate the first water droplets of the first diameter and the second water droplets of the second diameter.

Also disclosed herein is a control system for dispersing supercooled liquid water in an icing wind tunnel. The control system includes: a spray bar; a spray nozzle coupled to the spray bar; a pressure control valve coupled to the spray bar; a controller coupled to the pressure control valve and the spray nozzle; and a tangible, non-transitory memory configured to communicate with the controller, the tangible, non-transitory memory having instructions stored thereon that, in response to execution by the controller, cause the controller to perform operations including: receiving input identifying a selected liquid water content and a selected water droplet size for dispersing the supercooled liquid water in the icing wind tunnel; configuring an injector duty cycle of the spray nozzle to generate the selected liquid water content; and configuring the pressure control valve to generate the selected water droplet size, where configuring the spray nozzle and the pressure control valve disperses the supercooled liquid water in the icing wind tunnel.

In various embodiments, the instructions further cause the controller to perform operations including: receiving water droplet size data generated within the icing wind tunnel; determining whether a water pressure needs to change based on the water droplet size data; and sending a command to adjust the water pressure via the pressure control valve to either increase or decrease the water pressure in response to the water pressure needing to change. In various embodiments, the water droplet size data is interpreted based on data received from a pressure transducer associated with the spray bar or the water droplet size data is received from a water droplet size sensor. In various embodiments, the spray bar is a plurality of spray bars, where each spray bar in the plurality of spray bars includes a respective pressure control valve, and where the instructions to adjust the water pressure of the plurality of spray bars further cause the controller to perform operations including: sending individual commands to adjust the water pressure via the respective pressure control valves associated with the plurality of spray bars to either increase or decrease the water pressure in response to the water pressure needing to change.

In various embodiments, the instructions further cause the controller to perform operations including: receiving liquid water content data generated within the icing wind tunnel; determining whether a liquid water content needs to change based on the liquid water content data; and sending a command to adjust an injector duty cycle of the spray nozzle to increase or decrease the liquid water content in response to the liquid water content needing to change. In various embodiments, the liquid water content data is interpreted based on water flow data received from one or more water flow meters associated with the spray bar or the liquid water content data is received from a liquid water content sensor. In various embodiments, the spray nozzle is a plurality of spray nozzles, where the instructions to adjust the liquid water content of the plurality of spray nozzles further cause the controller to perform operations including: sending individual commands to the plurality of spray nozzles to adjust an injector duty cycle to increase or decrease the liquid water content in response to the liquid water content needing to change.

In various embodiments, the spray nozzle is at least one a low-pressure electronic pulse injector, a high-pressure electronic pulse injector, or a high-pressure piezoelectric pulse injector. In various embodiments, the spray bar is at least two spray bars, where a first spray bar of the at least two spray bars is a low-pressure spray bar, where a second spray bar of the at least two spray bars is a high-pressure spray bar, where the instructions further cause the controller to perform operations including: configuring the water pressure the first spray bar to generate first water droplets of a first diameter; configuring the water pressure to the second spray bar to generate second water droplets of a second diameter, where the second diameter is smaller than the first diameter; or configuring the water pressure to the first spray bar and the second spray bar to generate the first water droplets of the first diameter and the second water droplets of the second diameter.

Also disclosed herein is a method for dispersing supercooled liquid water in an icing wind tunnel. The method including: receiving input identifying a selected liquid water content and a selected water droplet size for dispersing the supercooled liquid water in the icing wind tunnel; configuring an injector duty cycle of a spray nozzle to generate the selected liquid water content; and configuring a pressure control valve to generate the selected water droplet size, wherein configuring the spray nozzle and the pressure control valve disperses the supercooled liquid water in the icing wind tunnel.

In various embodiments, the method further includes: receiving water droplet size data generated within the icing wind tunnel; determining whether a water pressure needs to change based on the water droplet size data; sending a command to adjust the water pressure via the pressure control valve to either increase or decrease the water pressure in response to the water pressure needing to change; receiving liquid water content data generated within the icing wind tunnel; determining whether a liquid water content needs to change based on the liquid water content data; and sending a command to adjust an injector duty cycle of the spray nozzle to increase or decrease the liquid water content in response to the liquid water content needing to change.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
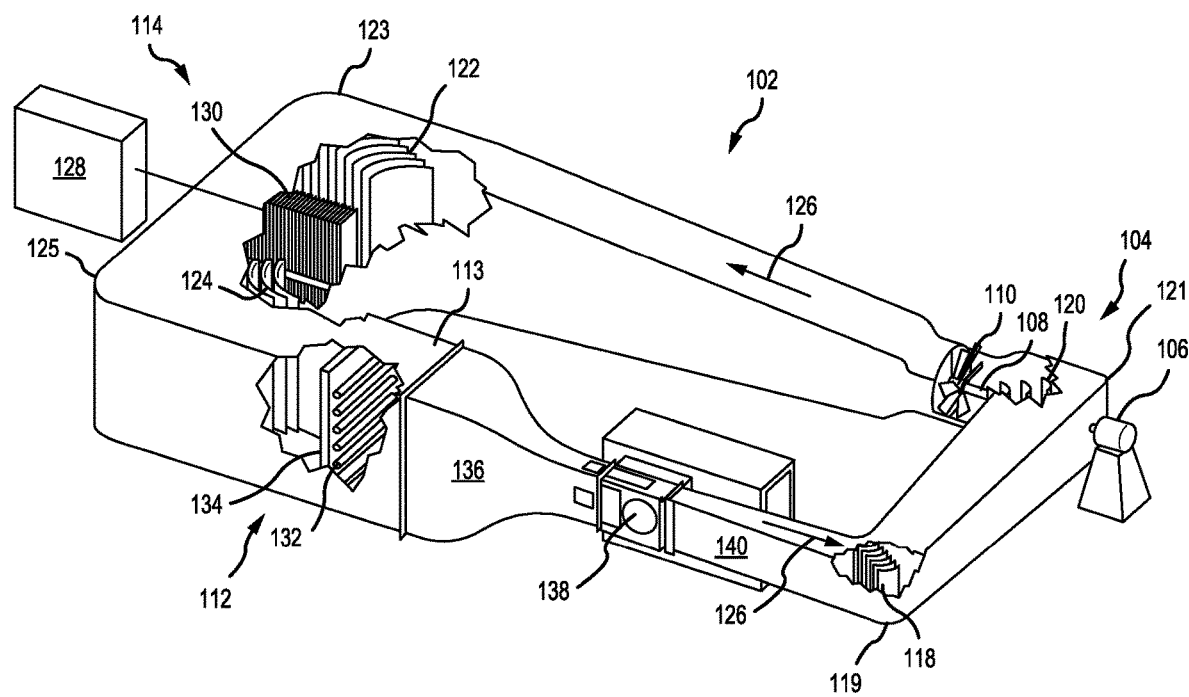
FIG. 1 illustrates an isometric view of a wind tunnel incorporating an icing simulation system in which the various embodiments may be implemented, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

The industry standard for an icing wind tunnel (IWT) is to use an air over water spray bar design. In this design, air pressure creates water droplet atomization, while the difference between water pressure and air pressure, combined with spray nozzle size, determines the nozzle's flow characteristics. The drawback to this approach is that to increase water droplet size, water pressure needs to be increased. However, increasing water pressure increases water mass flow rate. Thus, the resulting water mass flow rate and water droplet size are coupled and increase together.

The natural atmospheric icing environment encountered by aircraft has been characterized by the National Advisory Committee for Aeronautics and is currently defined by governing bodies such as the Federal Aviation Administration (FAA). Specifically, FAA 14 CFR Appendix C to Part 29 defines supercooled liquid water content vs mean effective drop diameter for continuous and intermittent natural icing environments. At cold temperatures, for example $-22°$ F., the liquid water content associated with a small water droplet size, such as 15 micron, is quite low, at only 0.2 $gr/m^3$. To achieve this condition in an IWT, a small nozzle size must be combined with relatively high air pressure. Unfortunately, this nozzle size is not useful for conditions needing larger diameter water droplets and low liquid water content or for conditions needing smaller diameter water droplets and high liquid water content, thus another nozzle is necessary. Therefore, many nozzle sizes are used to create all conditions that exist in nature as defined by the FAA continuous and intermittent curves.

To further complicate this approach, an IWT spray bar system typically contains many nozzles. For example, some current spray bars utilize 35 spray nozzles for a test section size of only 22"×44". As test section size increases, so does nozzle count. The nozzles are costly to manufacture and, for the 35 nozzles, take hours of labor to exchange. Over the course of a test campaign this swap out process may occur a number of times. Furthermore, many different nozzle sizes are required to create portions of the continuous and intermittent icing curves. For any nozzle used, air and water pressure curves must be developed, and the tunnel must be calibrated for the combination of pressure curves and nozzle size. Thus, utilizing multiple nozzles is costly.

Disclosed herein is a system and methods for utilizing electronic pulse injection to generate water droplets of different sizes in an icing wind tunnel. In various embodiments, utilizing electronic pulse injection technology, water droplet size may be controlled by water pressure alone while liquid water content may be controlled by the electronic pulse injector opening and closing cycle known as injector pulse width which is correlated to an injector duty cycle over a given span of time.

Referring now to FIG. 1, in accordance with various embodiments, an isometric view of a wind tunnel incorporating an icing simulation system in which the various embodiments may be implemented is illustrated. In various embodiments, the icing simulation system 100 includes icing wind tunnel 102, air drive system 104 (including motor 106, shaft 108, and axial fan 110), nozzle system 112, and cooling system 114. In various embodiments, icing wind tunnel 102 has turning vane 118 in corner 119 (corner #1), turning vane 120 in corner 121 (corner #2), turning vane 122 in corner 123 (corner #3), and turning vane 124 in corner 125 (corner #4). In various embodiments, turning vanes 118, 120, 122, and 124 aid in directing air flow 126 generated by air drive system 104 to turn or curve within the icing wind tunnel 102. In various embodiments, air flow 126 is generated by air drive system 104. In this illustrative example, air drive system 104 includes motor 106, shaft 108, and axial fan 110. In various embodiments, air flow 126 is cooled using cooling system 114. In various embodiments, cooling system 114 includes refrigeration system 128 and heat exchanger 130. In various embodiments, refrigeration system 128 and heat exchanger 130 operate to cool air within air flow 126 passing by or through heat exchanger 130. In various embodiments, nozzle system 112 within settling chamber 113 includes spray bars 132 and flow straightener 134. In various embodiments, spray bars 132 are configured to spray drops of deionized water within the icing wind tunnel 102. The drops of deionized water are carried by the air flow 126 through contraction section 136, test section 138, and test section diffuser section 140.

Figure 2:
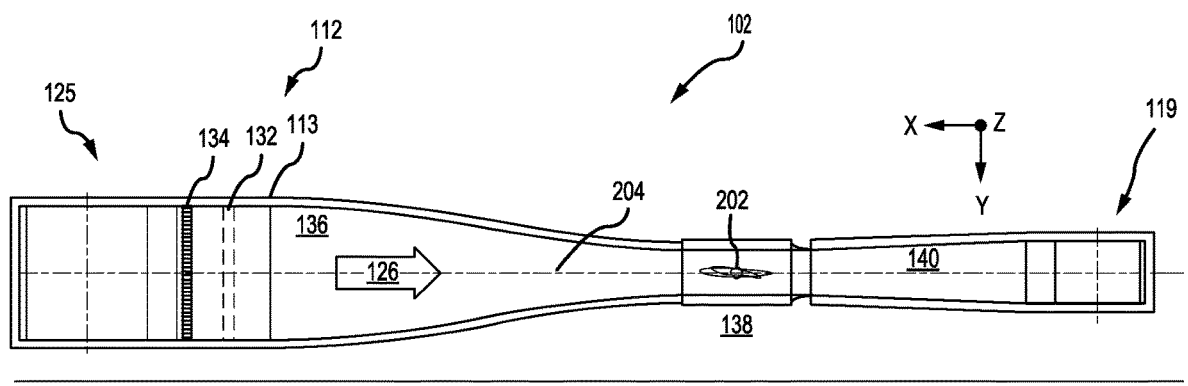
FIG. 2 illustrates a side view of a wind tunnel incorporating an icing simulation system in which the various embodiments may be implemented, in accordance with various embodiments.

Referring now to FIG. 2, in accordance with various embodiments, a side view of a wind tunnel incorporating an icing simulation system in which the various embodiments may be implemented is illustrated. The icing simulation system in FIG. 2 is similar to the icing simulation system 100 of FIG. 1, in that icing simulation system 100 in FIG.

2 includes the icing wind tunnel 102, where the icing wind tunnel 102 has turning vane 118 in corner 119 (corner #1) and turning vane 124 in corner 125 (corner #4). In various embodiments, turning vanes 118 and 124 aid in directing air flow 126 generated by air drive system 104 to turn or curve within the icing wind tunnel 102. In various embodiments, air flow 126 is generated by the air drive system 104 of FIG. 1 and the air flow 126 passes through nozzle system 112. In various embodiments, nozzle system 112 within settling chamber 113 includes spray bars 132 and flow straightener 134. In various embodiments, spray bars 132 are configured to spray drops of deionized water within the icing wind tunnel 102. The drops of deionized water are carried by the air flow 126 through contraction section 136, test section 138, and test section diffuser section 140. In various embodiments, a test model 202 may be placed within test section 138 and the spray drops of deionized water released by the spray bars 132 may be carried by the air flow 126 through contraction section 136 and impinging on the test model 202 in the test section 138.

In various embodiments, a calibration process is performed in the icing wind tunnel in which liquid water content produced by an injector duty cycle of a plurality of spray nozzles as well as water droplet size produced by a water pressure in a spray bar, to which the plurality of spray nozzles are coupled, is measured at varying injector duty cycles and water pressures, respectively. Based on the liquid water content data and water size droplet data gathered during the calibration process at the varying injector duty cycles and water pressures, various conditions may be generated within the icing wind tunnel that produces a given liquid water content and a given water droplet size based on the liquid water content data and water size droplet data gathered during the calibration process. Accordingly, in various embodiments, during a testing process, a controller may receive input identifying a selected liquid water content and a selected water droplet size and the controller may configure each of the plurality of spray nozzles and a pressure control valve associated with the spray bar to generate the selected liquid water content and the selected water droplet size, respectively. In various embodiments, liquid water content data and water size droplet data may be gathered during the testing process. In that regard, utilizing the liquid water content data and the water size droplet data gathered during the testing process, the controller may be configured to adjust one or more of the plurality of spray nozzles and the pressure control valve associated with the spray bar to maintain the selected liquid water content and the selected water droplet size, respectively. Hereafter, various processes are described to gather the liquid water content data and the water size droplet data and identify settings for and/or adjust one or more of the plurality of spray nozzles and the pressure control valve associated with the spray bar during one or more of the calibration process and testing process.

Figure 3:
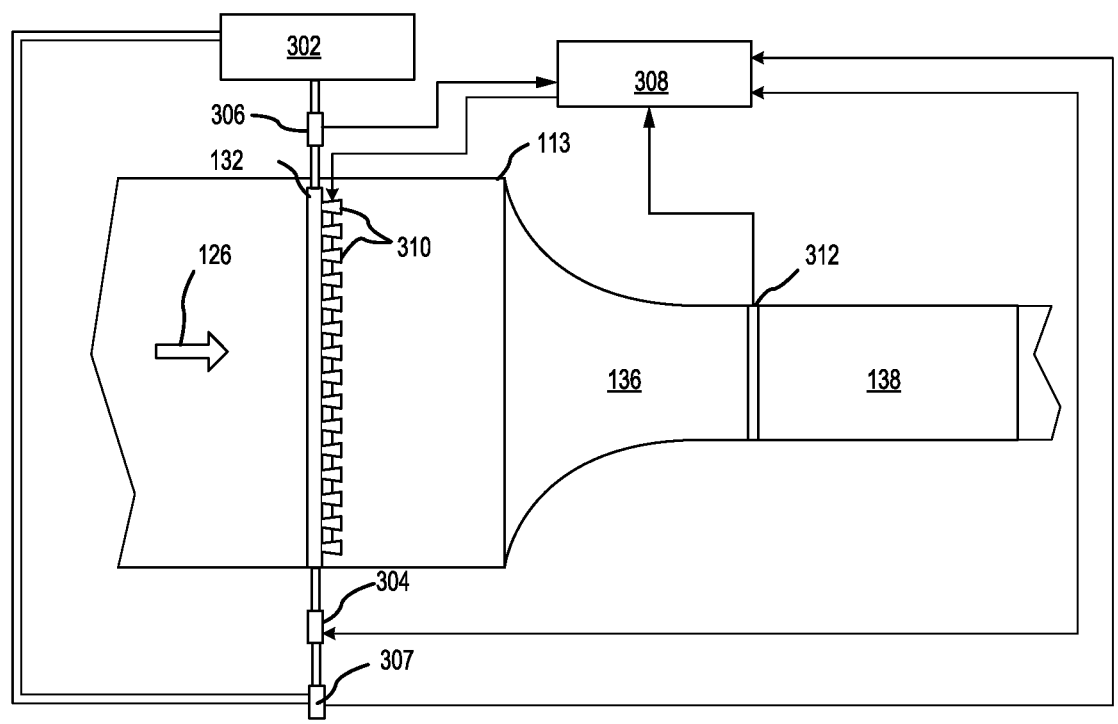
FIG. 3 a top view of a settling chamber of an icing wind tunnel, in accordance with various embodiments.

Referring now to FIG. 3, in accordance with various embodiments, a top view of a settling chamber of an icing wind tunnel is illustrated. In various embodiments, the settling chamber 113 of the icing wind tunnel 102 in FIG. 1 includes spray bar 132, which is coupled to pressurized water source 302 at a first end of the spray bar 132 with a plurality of spray nozzles 310 coupled to the spray bar 132 at other locations between the first end of the spray bar 132 and a second end of the spray bar 132. In various embodiments, a first flow meter 306 is coupled between the pressurized water source 302 and the first end of the spray bar 132. In various embodiments, as the deionized water flows from the pressurized water source 302 to the spray bar 132, the flow meter 306 measures the flow of the deionized water and provides water flow data to controller 308. The controller 308 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 308 may further include any non-transitory memory known in the art. The memory may store instructions usable by the logic device to perform operations as described herein. In various embodiments, as unutilized deionized water leaves the second end of the spray bar 132 and returns to pressurized water source 302, a second flow meter 307 measures the flow of the deionized water and provides water flow data to controller 308.

In various embodiments, air flow 126, generated by the air drive system 104 of FIG. 1, passes through nozzle system 112. In that regard, the plurality of spray nozzles 310 coupled to spray bar 132 are configured to generate a liquid water content within the icing wind tunnel 102, which is carried by the air flow 126 through contraction section 136 to the test section 138. In various embodiments, each of the plurality of spray nozzles may be low-pressure electronic pulse injectors, a high-pressure electronic pulse injectors, or a high-pressure piezoelectric pulse injectors. In that regard, in order to generate small water droplets, i.e., those water droplets defined in Appendix C icing conditions, either a high-pressure electronic pulse injector or a high-pressure piezoelectric pulse injector may be utilized. Further, in order to generate large water droplets, i.e., those water droplets defined in Appendix O icing conditions, a low-pressure electronic pulse injector may be utilized. In various embodiments, based on the water flow data from the first flow meter 306 and the second flow meter 307, the controller 308 may be configured to determine a difference, i.e., delta, in deionized water flow from the first flow meter 306 and the second flow meter 307 and adjust the amount of deionized water being injected into the icing wind tunnel 102. In that regard, the controller 308 may be configured to control send signals, based on the determined difference in water flow rate, to the plurality of spray nozzles 310 to control a duty cycle of the plurality of spray nozzles 310 and thereby control the amount of deionized water, i.e., the liquid water content, being injected into the icing wind tunnel 102.

In various embodiments, the icing wind tunnel further comprises a sensor mechanism 312. While the illustration in FIG. 3 depicts the sensor being located between the contraction section 136 and the test section 138, in various embodiments, the sensor mechanism 312 may be located at any location between the spray bars 132 and the test section 138. In various embodiments, the sensor mechanism 312 may be a liquid water content, i.e., water in a discrete liquid phase, sensor that measures an amount of deionized water being injected into the icing wind tunnel 102. In various embodiments, the sensor mechanism 312 may be a sensor such as an icing accretion sensor that measures a thickness of ice that builds up over time or a constant temperature hotwire sensor that measures current needed to evaporate water from the probe, among others. In various embodiments, the sensor mechanism 312 sends liquid water content data to the controller 308. With feedback from a liquid water content sensor, the controller 308 may be configured to control send signals to the plurality of spray nozzles 310 to control a duty cycle of the plurality of spray nozzles 310 and thereby control the amount of deionized water, i.e., the liquid water content, being injected into the icing wind tunnel 102.

In various embodiments, the sensor mechanism 312 takes the form of a droplet size sensor, such as a laser sensor system. In that regard, the sensor mechanism 312 sends a laser beam into the icing wind tunnel 102 where drops of deionized water are generated by the plurality of spray nozzles 310 in nozzle system 112 to determine water droplet diameter, i.e., a median volume diameter of the water droplet. In various embodiments, the sensor mechanism 312 sends droplet size data to the controller 308. With feedback from a droplet size sensor, the controller 308 may be configured to control the pressure within the spray bar 132 via the pressure control valve 304 and thereby control the water droplet size being injected into the icing wind tunnel 102. In various embodiments, pressure control valve 304 may be configured not only to control the pressure within the spray bar 132 but also measure a pressure of the deionized water associated with spray bar 132 via a pressure transducer associated with pressure control valve 304. In that regard, with feedback from the pressure transducer associated with the pressure control valve 304, the controller 308 may be configured to control the pressure within the spray bar 132 via the pressure control valve 304 and thereby control the water droplet size being injected into the icing wind tunnel 102.

In various embodiments, a liquid water content sensor may be used separately from a droplet size sensor. In various embodiments, a liquid water content sensor may be used simultaneously with a droplet size sensor.

Figure 4A:
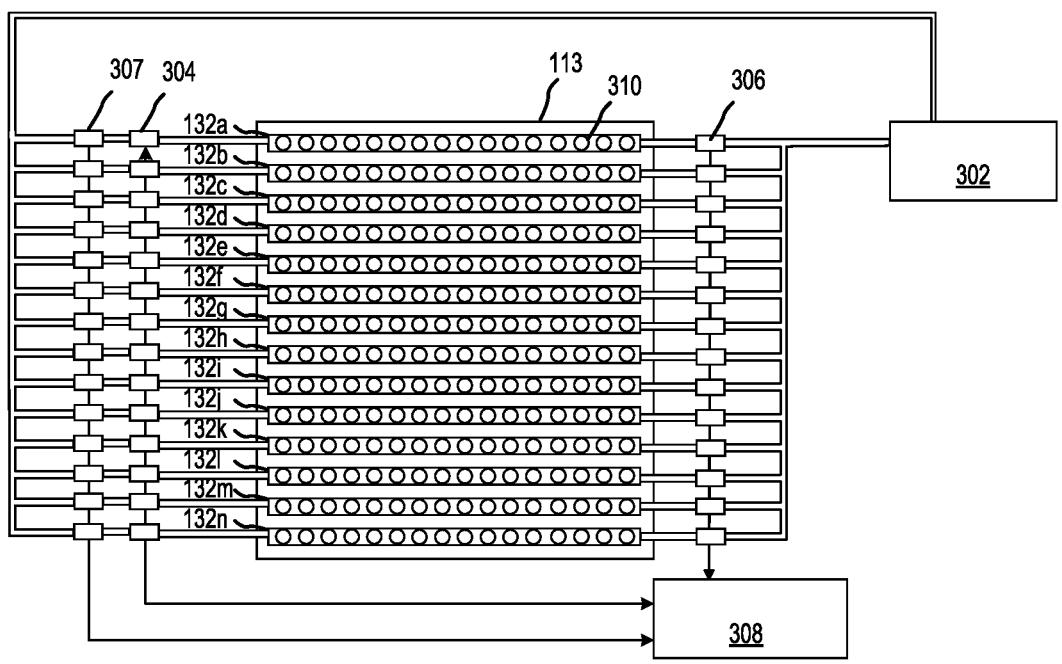
FIG. 4A illustrates a front view of a nozzle system within a settling chamber of an icing wind tunnel, in accordance with various embodiments.

Referring now to FIG. 4A, in accordance with various embodiments, a front view of a nozzle system within a settling chamber of an icing wind tunnel is illustrated. In various embodiments, the nozzle system includes a plurality of spray bars 132a-132n. In various embodiments, the plurality of spray bars 132a-132n are mounted horizontally. In various embodiments, the plurality of spray bars 132a-132n are mounted vertically. In various embodiment, the plurality of spray bars 132a-132n may be mounted in other orientations other than horizontally or vertically, such as diagonally or at another angle. In various embodiments, while only spray bars 132a-132n are illustrated, more or fewer spray bars may be present within the settling chamber 113. In various embodiments, each of the plurality of spray bars 132a-132n include a plurality of spray nozzles 310. In various embodiments, each of the spray bars 132a-132n is coupled to pressurized water source 302 at a first end of each of the spray bars 132a-132n with a plurality of spray nozzles 310 coupled to each of the spray bars 132a-132n at other locations between the first end of each of the spray bars 132a-132n and a second end of each of the spray bars 132a-132n. In the illustrated embodiment, a respective flow meter 306 is coupled between each the spray bars 132a-132n and the pressurized water source 302. In various embodiments, as deionized water flows from the pressurized water source 302 to each of the spray bars 132a-132n, each flow meter 306 measures the flow of deionized water to its respective spray bars 132a-132n and provides water flow data to controller 308. In various embodiments, as unutilized deionized water leaves the second end of each of the spray bars 132a-132n and returns to pressurized water source 302, a respective second flow meter 307 measures the flow of the deionized water and provides water flow data to controller 308. It is noted that a one-way valve may be located between each of the second flow meters 307 and the pressurized water source 302 so that the deionized water flows in only one direction from the pressurized water source 302 to each of the spray bars 132a-132n via the first flow meters 306. In various embodiments, based on the water flow data, the controller 308 may be configured to adjust a pressure within each of the spray bars 132a-132n using a respective pressure control valve 304. By adjusting the pressure within each of the spray bars 132a-132n, the controller 308 is configured to control the water droplet size being injected into the icing wind tunnel 102.

Figure 4B:
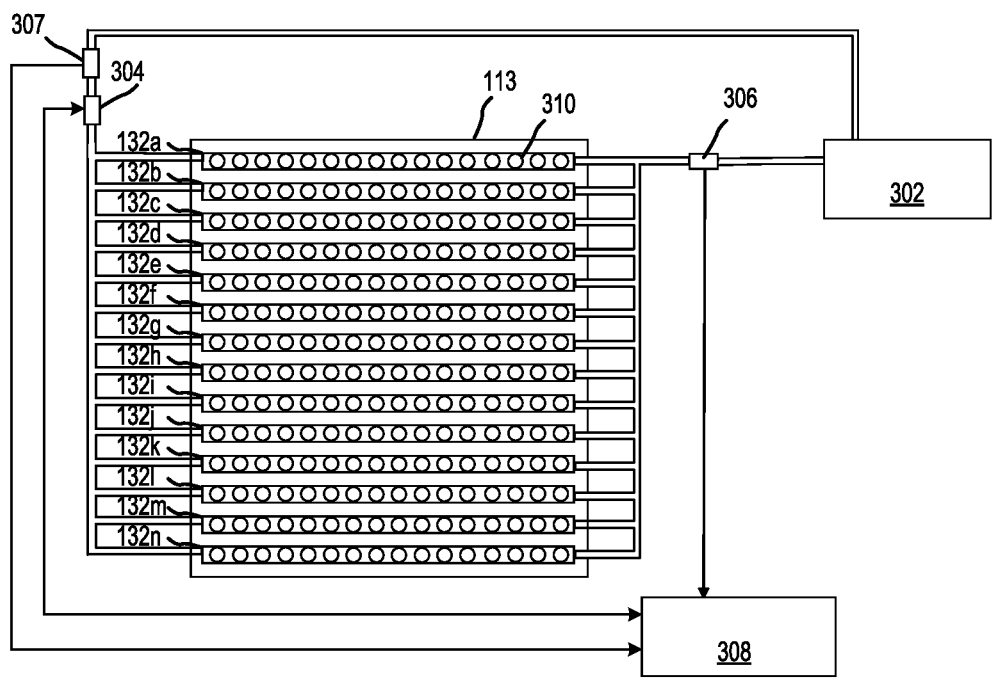
FIG. 4B illustrates a front view of a nozzle system within a settling chamber of an icing wind tunnel, in accordance with various embodiments.

Referring now to FIG. 4B, in accordance with various embodiments, a front view of a nozzle system within a settling chamber of an icing wind tunnel is illustrated. In various embodiments, the nozzle system includes a plurality of spray bars 132a-132n. In various embodiments, the plurality of spray bars 132a-132n are mounted horizontally. In various embodiments, the plurality of spray bars 132a-132n are mounted vertically. In various embodiment, the plurality of spray bars 132a-132n may be mounted in other orientations other than horizontally or vertically, such as diagonally or at another angle. In various embodiments, while only spray bars 132a-132n are illustrated, more or fewer spray bars may be present within the settling chamber 113. In various embodiments, each of the plurality of spray bars 132a-132n include a plurality of spray nozzles 310. In various embodiments, each of the spray bars 132a-132n is coupled to pressurized water source 302 at a first end of each of the spray bars 132a-132n with a plurality of spray nozzles 310 coupled to each of the spray bars 132a-132n at other locations between the first end of each of the spray bars 132a-132n and a second end of each of the spray bars 132a-132n. In the illustrated embodiment, only a single pressure and flow meter 306 is coupled between the pressurized water source 302 and all the spray bars 132a-132n. In various embodiments, as water flows from the pressurized water source 302 to each of the spray bars 132a-132n, flow meter 306 measures the flow of deionized water to the spray bars 132a-132n and provides water flow data to controller 308. In various embodiments, as unutilized deionized water leaves the second end of each of the spray bars 132a-132n and returns to pressurized water source 302, a single second flow meter 307 measures the flow of the deionized water and provides water flow data to controller 308. In various embodiments, based on the water flow data, the controller 308 may be configured to adjust a pressure within the spray bars 132a-132n using the pressure control valve 304. By adjusting the pressure within the spray bars 132a-132n, the controller 308 is configured to control the water droplet size being injected into the icing wind tunnel 102.

Figure 5:
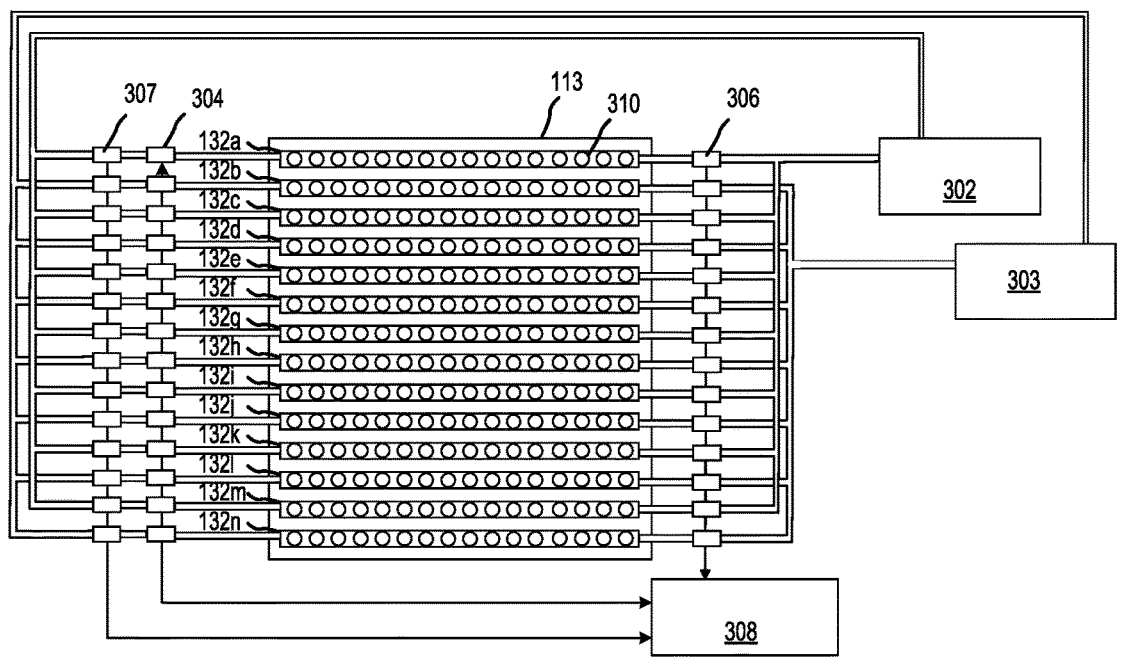
FIG. 5 illustrates a front view of a nozzle system within a settling chamber of an icing wind tunnel that utilizes both low-pressure pulse injectors and high-pressure pulse injectors, according to various embodiments.

In FIGS. 4A and 4B, the configuration is such that either low-pressure pulse injectors or high-pressure pulse injectors may be utilized for all of the plurality of spray nozzles 310. Referring now to FIG. 5, in accordance with various embodiments, a front view of a nozzle system within a settling chamber of an icing wind tunnel that utilizes both low-pressure pulse injectors and high-pressure pulse injectors is illustrated. In various embodiments, the nozzle system includes a plurality of spray bars 132a-132n. In various embodiments, the plurality of spray bars 132a-132n are mounted horizontally. In various embodiments, the plurality of spray bars 132a-132n are mounted vertically. In various embodiment, the plurality of spray bars 132a-132n may be mounted in other orientations other than horizontally or vertically, such as diagonally or at another angle. In various embodiments, while only spray bars 132a-132n are illustrated, more or fewer spray bars may be present within the settling chamber 113. In various embodiments, each of the plurality of spray bars 132a-132n include a plurality of spray nozzles 310. In various embodiments, each of the plurality of spray nozzles 310 coupled to spray bars 132*a*, 132*c*, 132*e*, 132*g*, 132*i*, 132*k*, and 132*m* may be low-pressure pulse injectors. In various embodiments, each of the plurality of spray nozzles 310 coupled to spray bars 132*b*, 132*d*, 132*f*, 132*h*, 132*j*, 132l, and 132*n* may be high-pressure pulse injectors.

In various embodiments, each of the spray bars 132*a*, 132*c*, 132*e*, 132*g*, 132*i*, 132*k*, and 132*m* is coupled to low-pressurized water source 302 at a first end of each of the spray bars 132*a*, 132*c*, 132*e*, 132*g*, 132*i*, 132*k*, and 132*m* with a plurality of low-pressure spray nozzles 310 coupled to each of the spray bars 132*a*, 132*c*, 132*e*, 132*g*, 132*i*, 132*k*, and 132*m* at other locations between the first end of each of the spray bars 132*a*, 132*c*, 132*e*, 132*g*, 132*i*, 132*k*, and 132*m* and a second end of each of the spray bars 132*a*, 132*c*, 132*e*, 132*g*, 132*i*, 132*k*, and 132*m*. In various embodiments, each of the spray bars 132*b*, 132*d*, 132*f*, 132*h*, 132*j*, 132l, and 132*n* is coupled to high-pressurized water source 303 at a first end of each of the spray bars 132*b*, 132*d*, 132*f*, 132*h*, 132*j*, 132l, and 132*n* with a plurality of high-pressure spray nozzles 310 coupled to each of the spray bars 132*b*, 132*d*, 132*f*, 132*h*, 132*j*, 132l, and 132*n* at other locations between the first end of each of the spray bars 132*b*, 132*d*, 132*f*, 132*h*, 132*j*, 132l, and 132*n* and a second end of each of the spray bars 132*b*, 132*d*, 132*f*, 132*h*, 132*j*, 132l, and 132*n*.

In the illustrated embodiment, a respective flow meter 306 is coupled between each the spray bars 132*a*-132*n* and the respective low-pressurized water source 302 and high-pressurized water source 303. In various embodiments, as deionized water flows from the low-pressurized water source 302 and the high-pressurized water source 303 to each of the spray bars 132*a*-132*n*, each flow meter 306 measures the flow of water to its respective spray bars 132*a*-132*n* and provides water flow data to controller 308. In various embodiments, as unutilized deionized water leaves the second end of each of the spray bars 132*a*-132*n* and returns to pressurized water source 302, a respective second flow meter 307 measures the flow of the deionized water and provides water flow data to controller 308. In various embodiments, based on the water flow data, the controller 308 may be configured to adjust a pressure within each of the spray bars 132*a*-132*n* using a respective pressure control valve 304. By adjusting the pressure within each of the spray bars 132*a*-132*n*, the controller 308 is configured to control the water droplet size being injected into the icing wind tunnel 102.

Accordingly, in the configuration illustrated in FIG. 5. A configuration process and/or a testing process may be run using:
Only a low-pressure configuration of low-pressurized water source 302; spray bars 132*a*, 132*c*, 132*e*, 132*g*, 132*i*, 132*k*, and 132*m*; and low-pressure pulse injectors,
Only a high-pressure configuration of high-pressurized water source 303; spray bars 132*b*, 132*d*, 132*f*, 132*h*, 132*j*, 132l, and 132*n*; and high-pressure pulse injectors, or A combination of the low-pressure configuration and the high-pressure configuration.

Figure 6:
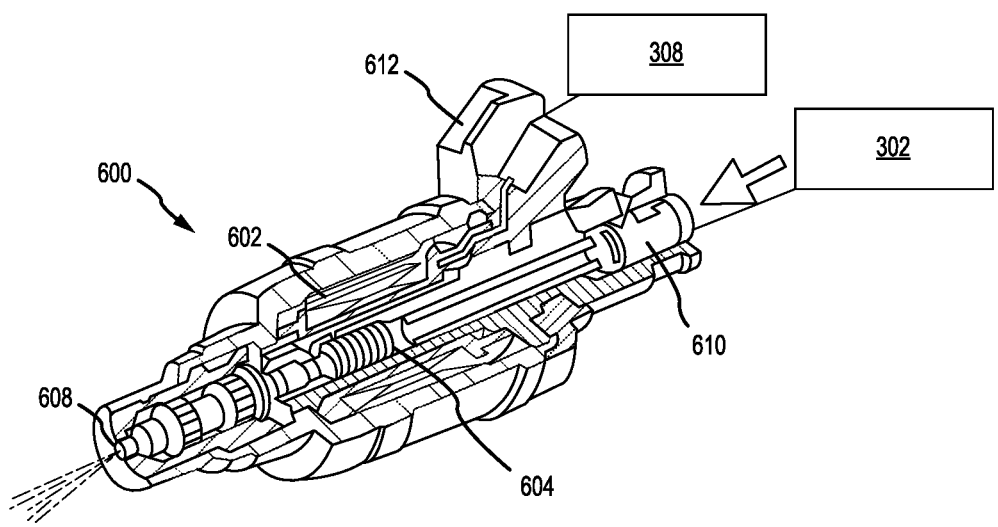
FIG. 6 illustrates a cross sectional isometric view of a spray nozzle that may be coupled to the spray bar, according to various embodiments.

Referring now to FIG. 6, in accordance with various embodiments, a cross sectional isometric view of a spray nozzle that may be coupled to the spray bar is illustrated. In various embodiments, each of the plurality of spray nozzles 310 described in FIGS. 3-5 may be a low-pressure electronic pulse injector 600 illustrated in FIG. 6. In various embodiments, the low-pressure electronic pulse injector 600 includes a solenoid 602, a valve spring 604, a plunger 606, a spray tip 608, a filter 610, and an electrical connector 612.

In various embodiments, the electrical connector 612 provides a connection of the low-pressure electronic pulse injector 600 to the controller 308. In various embodiments, the filter 610 filters pressurized water from the pressurized water source 302 provided to the low-pressure electronic pulse injector 600. In various embodiments, the controller 308 is configured to send a command via the electrical connector 612 that energizes the solenoid 602 that moves the plunger 606 which is compressed by the valve spring 604 thereby opening the valve and allowing the pressurized water to flow through the spray tip 608. The spray tip 608 is configured to atomize the deionized water to produce one or more water droplets.

In various embodiments, the liquid water content generated by the low-pressure electronic pulse injector 600 depends on an amount of time the valve stays open, which is controlled by the command sent by the controller 308. Based on the commands provided by the controller 308, in various embodiments, the electronic pulse injector 600 is capable of opening and closing many times per second, which is referred to as the injector duty cycle and which provide a plurality of water droplets that carried by the air flow through the contraction section to the test section. In various embodiments, the collective mass of the water droplets in a unit volume of cloud provided by the low-pressure electronic pulse injector 600 that form the plurality of spray nozzles 310 is defined as the liquid water content, which may be measured by a sensor mechanism, such as the sensor mechanism 312 of FIG. 3. In various embodiments, the liquid water content measurement is fed back to the controller 308 and the controller 308 is configured to send a command to control the injector duty cycle of the low-pressure electronic pulse injector 600 based on the liquid water content measurement.

Figure 7:
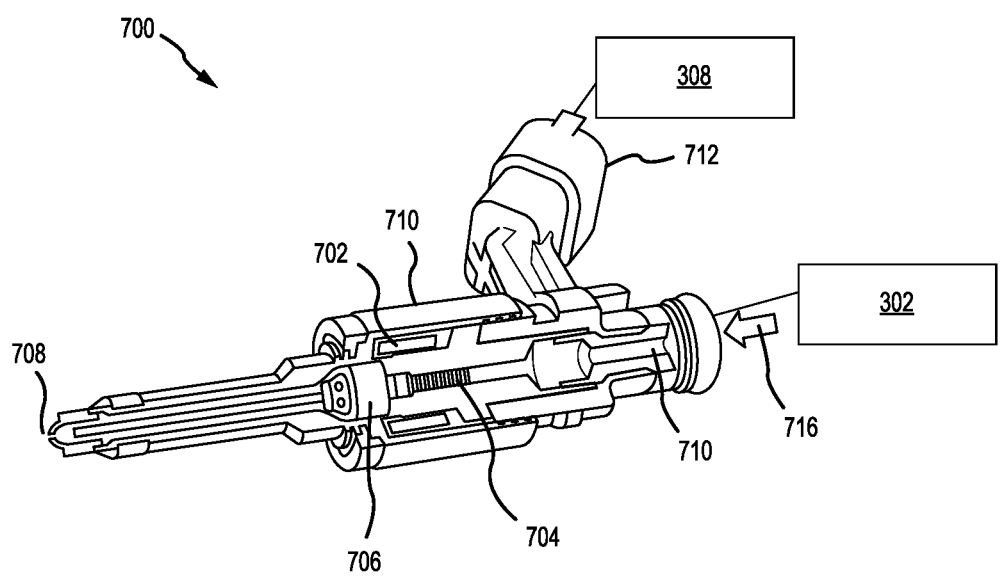
FIG. 7 illustrates a cross sectional isometric view of a spray nozzle that may be coupled to the spray bar, according to various embodiments.

Referring now to FIG. 7, in accordance with various embodiments, a cross sectional isometric view of a spray nozzle that may be coupled to the spray bar is illustrated. In various embodiments, each of the plurality of spray nozzles 310 described in FIGS. 3-5 may be a high-pressure electronic pulse injector 700 illustrated in FIG. 7. In various embodiments, the high-pressure electronic pulse injector 700 includes a coil 702, a valve spring 704, a plunger 706, a spray tip 708, a filter 710, and an electrical connector 712. In various embodiments, the electrical connector 712 provides a connection of the high-pressure electronic pulse injector 700 to the controller 308. In various embodiments, the filter 710 filters pressurized water from the pressurized water source 302 provided to the high-pressure electronic pulse injector 700. In various embodiments, the controller 308 is configured to send a command via the electrical connector 712 that energizes the coil 702 that moves the plunger 706 which is compressed by the valve spring 704 thereby opening the valve and allowing the pressurized water to squirt out through the spray tip 708. The spray tip 708 is configured to atomize the deionized water to produce one or more water droplets.

In various embodiments, the liquid water content generated by the high-pressure electronic pulse injector 700 depends on an amount of time the valve stays open, which is controlled by the command sent by the controller 308. Based on the commands provided by the controller 308, in various embodiments, the electronic pulse injector is capable of opening and closing many times per second, which is referred to as the injector duty cycle and which provide a plurality of water droplets that carried by the air flow through the contraction section to the test section. In various embodiments, the collective mass of the water droplets in a unit volume of cloud provided by the high-pressure electronic pulse injector 700 that form each of the plurality of spray nozzles 310 is defined as the liquid water content, which may be measured by a sensor mechanism, such as the sensor mechanism 312 of FIG. 3. In various embodiments, the liquid water content measurement is fed back to the controller 308 and the controller 308 is configured to send a command to control the injector duty cycle of the high-pressure electronic pulse injector 700 based on the liquid water content measurement.

Figure 8:
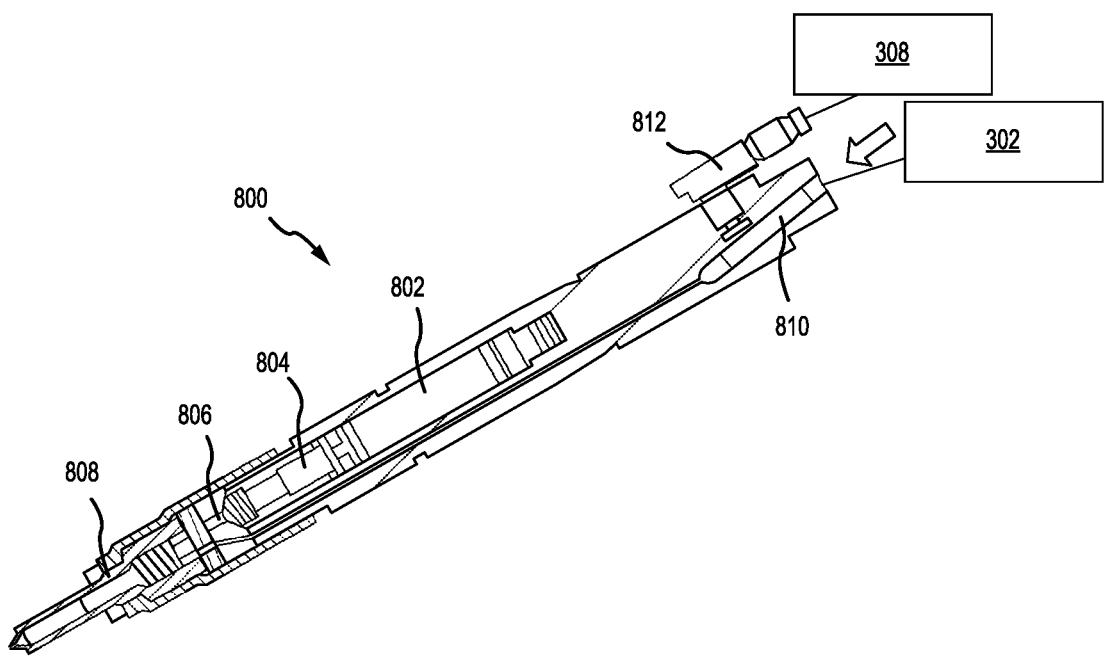
FIG. 8 illustrates a cross sectional isometric view of a spray nozzle that may be coupled to the spray bar, according to various embodiments.

Referring now to FIG. 8, in accordance with various embodiments, a cross sectional isometric view of a spray nozzle that may be coupled to the spray bar is illustrated. In various embodiments, each of the plurality of spray nozzles 310 described in FIGS. 3-5 may be a high-pressure piezoelectric pulse injector 800 illustrated in FIG. 8. In various embodiments, the high-pressure piezoelectric pulse injector 800 includes a piezo actuator mechanism 802, a coupling mechanism 804, a control valve 806, a nozzle mechanism 808, a filter 810, and an electrical connector 812. In various embodiments, the electrical connector 812 provides a connection of the high-pressure piezoelectric pulse injector 800 to the controller 308. In various embodiments, the filter 810 filters pressurized water from the pressurized water source 302 provided to the high-pressure piezoelectric pulse injector 800. In various embodiments, the controller 308 is configured to send a command via the electrical connector 812 that provides an electrical signal to a stack of piezo slices within the piezo actuator mechanism 802. In various embodiment, with the electrical signal applied, the electrical signal expands the piezo slices in the piezo actuator mechanism 802 and a combined expansion the piezo slices such that piezo actuator mechanism 802 translates the coupling mechanism 804 in a lateral direction and opens the control valve 806 allowing the pressurized water to squirt out through the nozzle mechanism 808. The nozzle mechanism 808 is configured to atomize the deionized water to produce one or more water droplets.

In various embodiments, the liquid water content generated by the high-pressure piezoelectric pulse injector 800 depends on an amount of time the valve stays open, which is controlled by the command sent by the controller 308. Based on the commands provided by the controller 308, in various embodiments, the electronic pulse injector is capable of opening and closing many times per second, which is referred to as the injector duty cycle and which provide a plurality of water droplets that carried by the air flow through the contraction section to the test section. In various embodiments, the collective mass of the water droplets in a unit volume of cloud provided by the high-pressure piezoelectric pulse injector 800 that form each of the plurality of spray nozzles 310 is defined as the liquid water content, which may be measured by a sensor mechanism, such as the sensor mechanism 312 of FIG. 3. In various embodiments, the liquid water content measurement is fed back to the controller 308 and the controller 308 is configured to send a command to control the injector duty cycle of the high-pressure piezoelectric pulse injector 800 based on the liquid water content measurement.

Figure 9:
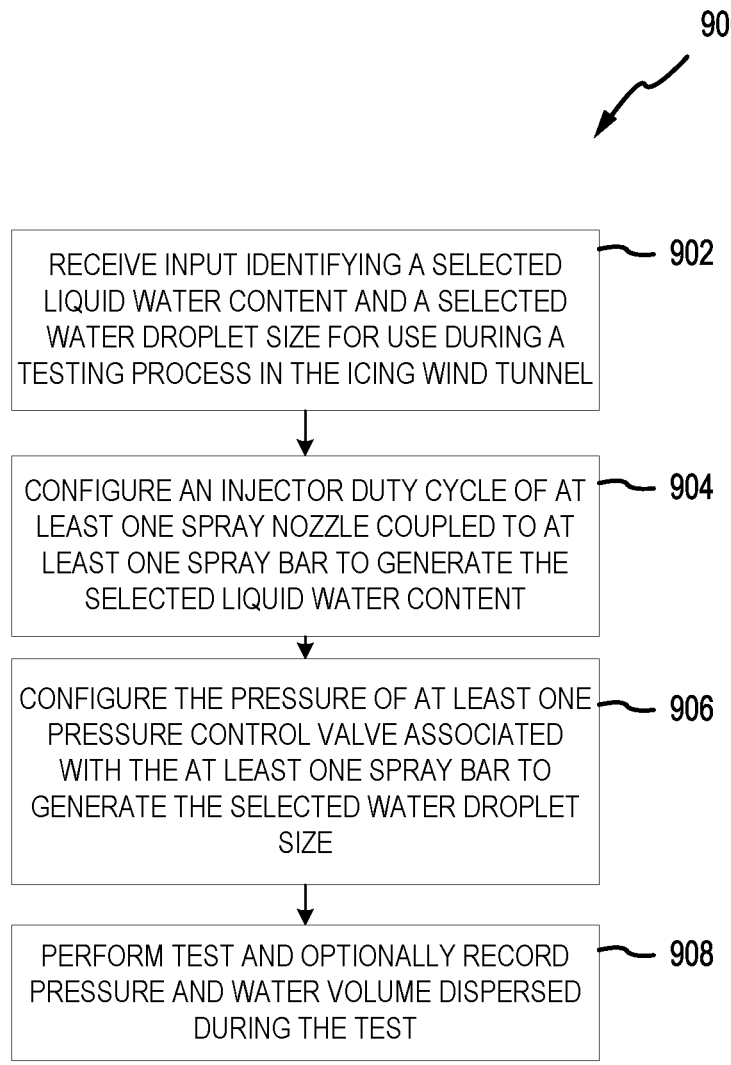
FIG. 9 illustrates an open loop method for utilizing electronic pulse injection in an icing wind tunnel, according to various embodiments.

Referring now to FIG. 9, in accordance with various embodiments, an open loop method 900 for utilizing electronic pulse injection in an icing wind tunnel is illustrated. The method 900 may be performed by a controller 308 described above with respect to FIGS. 3-8. At block 902, the controller 308 receives input identifying a selected liquid water content and a selected water droplet size for use during a testing process in the icing wind tunnel 102. At block 904, the controller 308 configures an injector duty cycle of at least one spray nozzle 310 coupled to at least one spray bar 132 to generate the selected liquid water content. In various embodiments, the selected liquid water content is based on liquid water content data gathered during a calibration process. At block 906, the controller 308 configures the pressure of at least one pressure control valve 304 associated with the at least one spray bar 132 to generate the selected water droplet size. In various embodiments, the selected water droplet size is based on water droplet size data gathered during the calibration process. At block 908, the controller performs a test and optionally records the pressure and water volume dispersed during the test.

Figure 10:
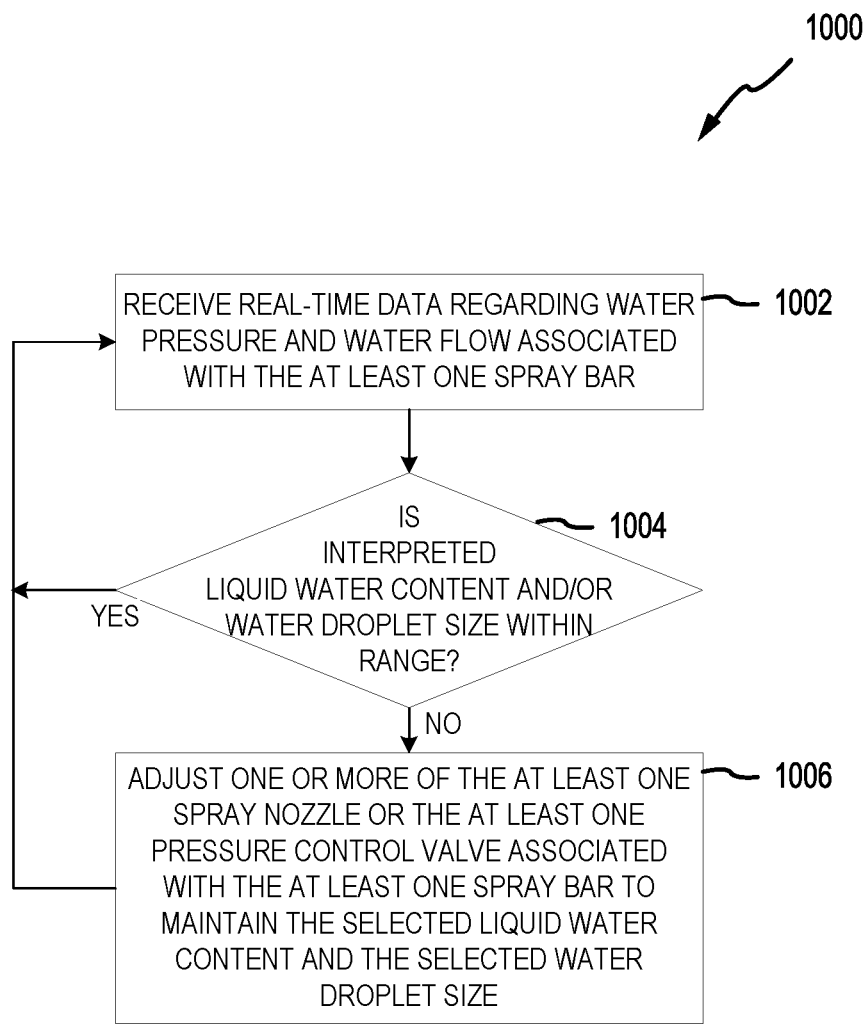
FIG. 10 illustrates a method for utilizing real-time feedback for electronic pulse injection in an icing wind tunnel, according to various embodiments.

Referring now to FIG. 10, in accordance with various embodiments, method 1000 for utilizing real-time feedback for electronic pulse injection in an icing wind tunnel is illustrated. At block 1002, the controller 308 receives real-time data regarding water pressure associated with the at least one spray bar 132 from a pressure transducer associated with the at least one pressure control valve 304 and water flow associated with the at least one spray bar 132 from one or more flow meters 306, 307. At block 1004, the controller 308 determines whether a liquid water content and/or water droplet size, which are interpreted based on the received real-time pressure and water flow data based on calculations generated from a performed calibration, is/are within a range of the selected liquid water content and the selected water droplet size, respectively. In various embodiment, the range may be within 10%, within 5%, within 1%, within 0.1%, or within 0.01% of the selected liquid water content and the selected water droplet size. If at block 1004 the interpreted liquid water content and/or water droplet size is within the range, the operation returns to block 1002. If at block 1004 the interpreted liquid water content and/or water droplet size is outside the range, then, at block 1006, the controller 308 adjusts one or more of the at least one spray nozzle 310 or the at least one pressure control valve 304 associated with the at least one spray bar 132 to move the selected liquid water content and the selected water droplet size within the range, with the operation returning to block 1002 thereafter.

Figure 11:
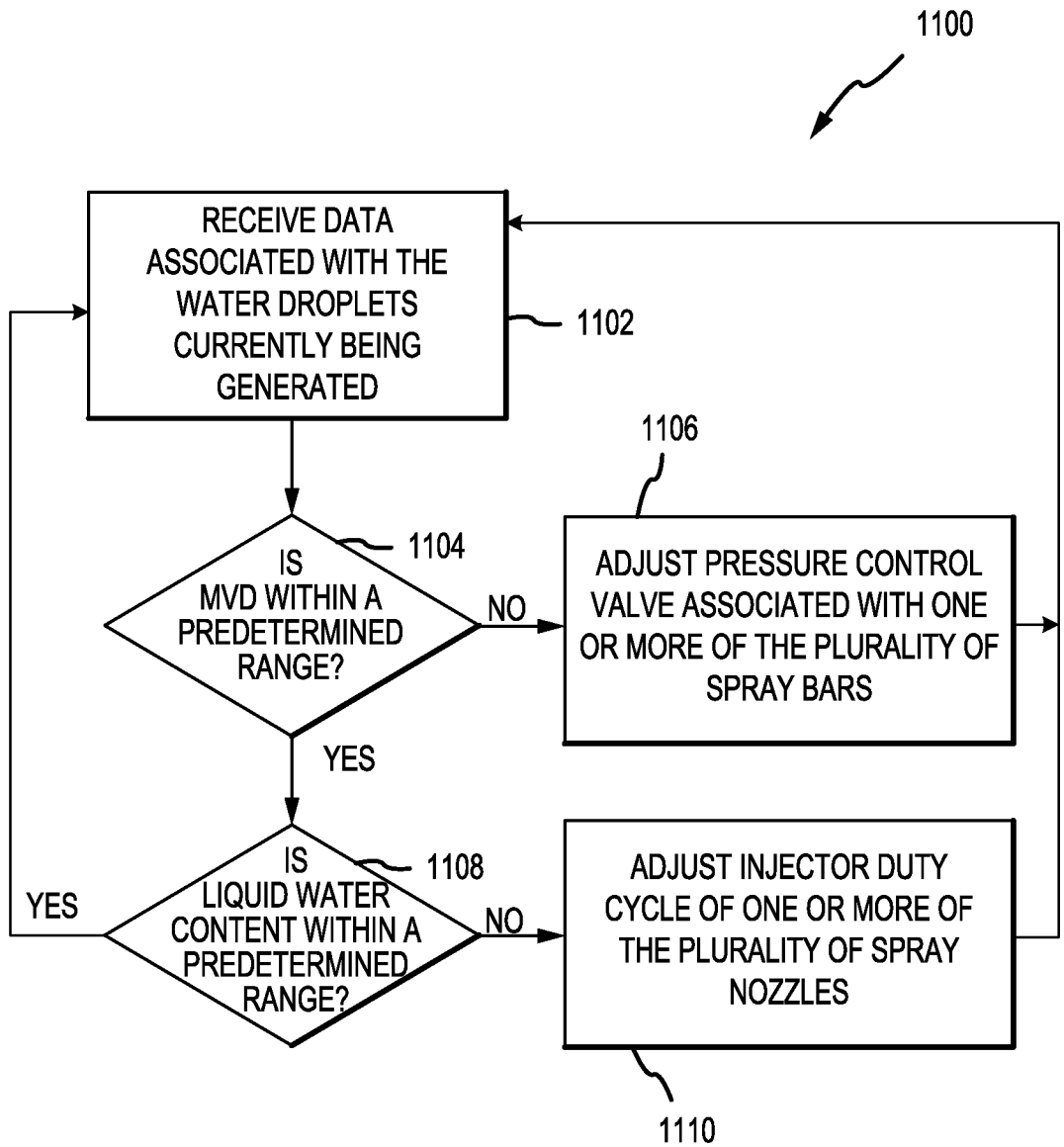
FIG. 11 illustrates a method for utilizing feedback for electronic pulse injection in an icing wind tunnel, according to various embodiments.

Referring now to FIG. 11, in accordance with various embodiments, a method 1100 for utilizing feedback for electronic pulse injection in an icing wind tunnel is illustrated. The method 1100 may be performed by a controller 308 described above with respect to FIGS. 3-8. At block 1102, the controller 308 receives data associated with the water droplets being generated by spray nozzles of a spray bar in a nozzle system. At block 1104, the controller 308 determines whether a Median Volume Diameter (MVD) being received is within a predetermined range based on the received data. If at block 1104 the MVD is outside the range and needs to be adjusted, then, at block 1106, the controller 308 sends a command to adjust a pressure control valve associated with one or more of the plurality of spray bars or the plurality of spray nozzles, with the operation returning to block 1102 thereafter. If at block 1104 the water pressure is within the range and does not need to be adjusted, then, at block 1108, the controller 308 determines whether the liquid water content being received is within a predetermined range based on the received data. If at block 1108 the liquid water content is outside the range and needs to be adjusted, then, at block 1110, the controller 308 sends a command to adjust injector a duty cycle of one or more of the plurality of spray nozzles, with the operation returning to block 1102 thereafter. If at block 1108 the liquid water content is within the range and does not need to be adjusted, then the operation returns block 1102.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for dispersing supercooled liquid water in an icing wind tunnel, the system comprising:
   a spray bar;
   a spray nozzle coupled to the spray bar;
   a pressure control valve coupled to the spray bar;
   a sensor mechanism located between a contraction section and a test section of the icing wind tunnel, the sensor mechanism including at least a liquid water content sensor configured to measure an amount of deionized water being injected into the icing wind tunnel and a droplet size sensor configured to measure water droplet diameter of the water droplets injected into the icing wind tunnel; and
   a controller coupled to the pressure control valve and the spray nozzle, wherein the controller is configured to:
      receive input identifying a selected liquid water content and a selected water droplet size for dispersing the supercooled liquid water in the icing wind tunnel;
      configure an injector duty cycle of the spray nozzle to generate the selected liquid water content; and
      configure the pressure control valve to generate the selected water droplet size, wherein configuring the spray nozzle and the pressure control valve disperses the supercooled liquid water in the icing wind tunnel.

2. The system of claim 1, wherein the controller is further configured to:
   receive, via the droplet size sensor, water droplet size data generated within the icing wind tunnel;
   determine whether a water pressure needs to change based on the water droplet size data; and
   send a command to adjust the water pressure via the pressure control valve to either increase or decrease the water pressure in response to the water pressure needing to change.

3. The system of claim 2, wherein the water droplet size data is further interpreted based on data received from a pressure transducer associated with the spray bar.

4. The system of claim 2,
   wherein the spray bar is a plurality of spray bars,
   wherein each spray bar in the plurality of spray bars comprises a respective pressure control valve, and
   wherein adjusting the water pressure of the plurality of spray bars comprises the controller being configured to:
      send individual commands to adjust the water pressure via the respective pressure control valves associated with the plurality of spray bars to either increase or decrease the water pressure in response to the water pressure needing to change.

5. The system of claim 1, wherein the controller is further configured to:
  receive, via the liquid water content sensor, liquid water content data generated within the icing wind tunnel;
  determine whether a liquid water content needs to change based on the liquid water content data; and
  send a command to adjust the injector duty cycle of the spray nozzle to increase or decrease the liquid water content in response to the liquid water content needing to change.

6. The system of claim 5, wherein the liquid water content data is further interpreted based on water flow data received from one or more water flow meters associated with the spray bar.

7. The system of claim 5,
  wherein the spray nozzle is a plurality of spray nozzles, and
  wherein adjusting the liquid water content of the plurality of spray nozzles comprises the controller being configured to:
    send individual commands to the plurality of spray nozzles to adjust the injector duty cycle to increase or decrease the liquid water content in response to the liquid water content needing to change.

8. The system of claim 1, wherein the spray nozzle is at least one of a low-pressure electronic pulse injector, a high-pressure electronic pulse injector, or a high-pressure piezoelectric pulse injector.

9. The system of claim 1,
  wherein the spray bar is at least two spray bars,
  wherein a first spray bar of the at least two spray bars is a low-pressure spray bar,
  wherein a second spray bar of the at least two spray bars is a high-pressure spray bar,
  wherein the controller is further configured to:
    configure the water pressure to the first spray bar to generate first water droplets of a first diameter;
    configure the water pressure to the second spray bar to generate second water droplets of a second diameter, wherein the second diameter is smaller than the first diameter; or
    configure the water pressure to the first spray bar and the second spray bar to generate the first water droplets of the first diameter and the second water droplets of the second diameter.

10. A control system for dispersing supercooled liquid water in an icing wind tunnel, the control system comprising:
  a spray bar;
  a spray nozzle coupled to the spray bar;
  a pressure control valve coupled to the spray bar;
  a sensor mechanism located between a contraction section and a test section of the icing wind tunnel, the sensor mechanism including at least a liquid water content sensor configured to measure an amount of deionized water being injected into the icing wind tunnel and a droplet size sensor configured to measure water droplet diameter of the water droplets injected into the icing wind tunnel;
  a controller coupled to the pressure control valve and the spray nozzle; and
  a tangible, non-transitory memory configured to communicate with the controller, the tangible, non-transitory memory having instructions stored thereon that, in response to execution by the controller, cause the controller to perform operations comprising:
    receiving input identifying a selected liquid water content and a selected water droplet size for dispersing the supercooled liquid water in the icing wind tunnel;
    configuring an injector duty cycle of the spray nozzle to generate the selected liquid water content; and
    configuring the pressure control valve to generate the selected water droplet size, wherein configuring the spray nozzle and the pressure control valve disperses the supercooled liquid water in the icing wind tunnel.

11. The control system of claim 10, wherein the instructions further cause the controller to perform operations comprising:
  receiving, via the droplet size sensor, water droplet size data generated within the icing wind tunnel;
  determining whether a water pressure needs to change based on the water droplet size data; and
  sending a command to adjust the water pressure via the pressure control valve to either increase or decrease the water pressure in response to the water pressure needing to change.

12. The control system of claim 11, wherein the water droplet size data is further interpreted based on data received from a pressure transducer associated with the spray bar.

13. The control system of claim 11,
  wherein the spray bar is a plurality of spray bars,
  wherein each spray bar in the plurality of spray bars comprises a respective pressure control valve, and
  wherein the instructions to adjust the water pressure of the plurality of spray bars further cause the controller to perform operations comprising:
    sending individual commands to adjust the water pressure via the respective pressure control valves associated with the plurality of spray bars to either increase or decrease the water pressure in response to the water pressure needing to change.

14. The control system of claim 10, wherein the instructions further cause the controller to perform operations comprising:
  receiving, via the liquid water content sensor, liquid water content data generated within the icing wind tunnel;
  determining whether a liquid water content needs to change based on the liquid water content data; and
  sending a command to adjust the injector duty cycle of the spray nozzle to increase or decrease the liquid water content in response to the liquid water content needing to change.

15. The control system of claim 14, wherein the liquid water content data is further interpreted based on water flow data received from one or more water flow meters associated with the spray bar.

16. The control system of claim 14,
  wherein the spray nozzle is a plurality of spray nozzles, and
  wherein the instructions to adjust the liquid water content of the plurality of spray nozzles further cause the controller to perform operations comprising:
    sending individual commands to the plurality of spray nozzles to adjust the injector duty cycle to increase or decrease the liquid water content in response to the liquid water content needing to change.

17. The control system of claim 10, wherein the spray nozzle is at least one of a low-pressure electronic pulse injector, a high-pressure electronic pulse injector, or a high-pressure piezoelectric pulse injector.

18. The control system of claim 10,
  wherein the spray bar is at least two spray bars, wherein a first spray bar of the at least two spray bars is a low-pressure spray bar,
wherein a second spray bar of the at least two spray bars is a high-pressure spray bar,
wherein the instructions further cause the controller to perform operations comprising:
configuring the water pressure to the first spray bar to generate first water droplets of a first diameter;
configuring the water pressure to the second spray bar to generate second water droplets of a second diameter, wherein the second diameter is smaller than the first diameter; or
configuring the water pressure to the first spray bar and the second spray bar to generate the first water droplets of the first diameter and the second water droplets of the second diameter.

19. A method for dispersing supercooled liquid water in an icing wind tunnel, the method comprising:
receiving input identifying a selected liquid water content and a selected water droplet size for dispersing the supercooled liquid water in the icing wind tunnel;
configuring an injector duty cycle of a spray nozzle to generate the selected liquid water content;
configuring a pressure control valve to generate the selected water droplet size, wherein configuring the spray nozzle and the pressure control valve disperses the supercooled liquid water in the icing wind tunnel;
receiving, via a droplet size sensor located between a contraction section and a test section of the icing wind tunnel and configured to measure water droplet diameter of the water droplets injected into the icing wind tunnel, water droplet size data generated within the icing wind tunnel;
determining whether a water pressure needs to change based on the water droplet size data;
sending a first command to adjust the water pressure via the pressure control valve to either increase or decrease the water pressure in response to the water pressure needing to change;
receiving, via a liquid water content sensor located between the contraction section and the test section of the icing wind tunnel and configured to measure an amount of deionized water being injected into the icing wind tunnel, liquid water content data generated within the icing wind tunnel;
determining whether a liquid water content needs to change based on the liquid water content data; and
sending a second command to adjust the injector duty cycle of the spray nozzle to increase or decrease the liquid water content in response to the liquid water content needing to change.

* * * * *